(12) United States Patent
Furukawa et al.

(10) Patent No.: US 12,139,602 B2
(45) Date of Patent: Nov. 12, 2024

(54) THERMOPLASTIC POLYESTER RESIN COMPOSITION

(71) Applicant: TOYOBO CO., LTD., Osaka (JP)

(72) Inventors: Kaori Furukawa, Otsu (JP); Motonobu Kamiya, Otsu (JP); Yasuto Fujii, Osaka (JP); Takahiro Shimizu, Otsu (JP)

(73) Assignee: TOYOBO MC CORPORATION, Osaka (JP)

(*) Notice: Subject to any disclaimer, the term of this patent is extended or adjusted under 35 U.S.C. 154(b) by 694 days.

(21) Appl. No.: 17/435,874

(22) PCT Filed: Feb. 28, 2020

(86) PCT No.: PCT/JP2020/008338
§ 371 (c)(1),
(2) Date: Sep. 2, 2021

(87) PCT Pub. No.: WO2020/179668
PCT Pub. Date: Sep. 10, 2020

(65) Prior Publication Data
US 2022/0145069 A1 May 12, 2022

(30) Foreign Application Priority Data
Mar. 6, 2019 (JP) .................. 2019-040408

(51) Int. Cl.
*C08L 67/02* (2006.01)
*B29C 45/00* (2006.01)
(Continued)

(52) U.S. Cl.
CPC .......... *C08L 67/02* (2013.01); *B29C 45/0001* (2013.01); *C08G 63/183* (2013.01);
(Continued)

(58) Field of Classification Search
CPC .................. C08L 67/02; C08L 67/025; C08L 2205/025; C08L 2205/035; C08L 2207/04; C08K 7/14
See application file for complete search history.

(56) References Cited

U.S. PATENT DOCUMENTS

2015/0368458 A1   12/2015   Sun et al.

FOREIGN PATENT DOCUMENTS

| JP | 50-1146 | 1/1975 |
| JP | 10-36645 | 2/1998 |

(Continued)

OTHER PUBLICATIONS

International Search Report (ISR) issued May 26, 2020 in International (PCT) Application No. PCT/JP2020/008338.
(Continued)

*Primary Examiner* — Kregg T Brooks
(74) *Attorney, Agent, or Firm* — Wenderoth, Lind & Ponack, L.L.P.

(57) ABSTRACT

The present invention relates to a polyester resin composition comprising 18 to 35 parts by mass of a polybutylene terephthalate resin (A), 10 to 25 parts by mass of a polyethylene terephthalate resin (B), 10 to 20 parts by mass of a thermoplastic polyester elastomer (C), 0.5 to 5 parts by mass of an epoxy group-containing ethylene copolymer (D), 12 to 20 parts by mass of a spherical and/or amorphous inorganic filler (E), 10 to 35 parts by mass of a glass fiber reinforcing material (F), 0 to 10 parts by mass of a polycarbonate resin (G), and 0 to 2 parts by mass of a transesterification inhibitor (H). The polyester resin composition is excellent in heat resistance, capable of imparting toughness to a molding while remedying sink marks.

3 Claims, 1 Drawing Sheet a: 45mm
b: 100mm
c: 6mm
d: 1mm
e: 14mm
f: 2mm
g: 2mm
h: 22mm
i: 15mm
j: 3.8mm
k: 1mm

(51) Int. Cl.
*B29K 69/00* (2006.01)
*C08G 63/183* (2006.01)
*C08K 7/14* (2006.01)
*C08K 7/20* (2006.01)

(52) U.S. Cl.
CPC .................. *C08K 7/14* (2013.01); *C08K 7/20* (2013.01); *B29C 2945/76531* (2013.01); *B29K 2069/00* (2013.01); *C08K 2201/003* (2013.01); *C08L 2201/08* (2013.01); *C08L 2203/30* (2013.01); *C08L 2205/025* (2013.01); *C08L 2205/035* (2013.01); *C08L 2207/04* (2013.01)

(56) References Cited

FOREIGN PATENT DOCUMENTS

| | | |
|---|---|---|
| JP | 11-106624 | 4/1999 |
| JP | 11-335536 | 12/1999 |
| JP | 2001-234046 | 8/2001 |
| JP | 3933838 | 6/2007 |
| JP | 2008-103299 | 5/2008 |
| JP | 2009-7482 | 1/2009 |
| JP | 2009-173899 | 8/2009 |
| JP | 2009-215347 | 9/2009 |
| JP | 2013-203869 | 10/2013 |
| JP | 5407530 | 2/2014 |
| WO | 2015/008831 | 1/2015 |

OTHER PUBLICATIONS

Extended European Search Report issued Sep. 29, 2022 in corresponding European Patent Application No. 20767007.

THERMOPLASTIC POLYESTER RESIN COMPOSITION

TECHNICAL FIELD

The present invention relates to a thermoplastic polyester resin composition from which a molding having high toughness can be produced with suppressed occurrence of sink marks.

BACKGROUND ART

Generally, due to excellence in mechanical properties, heat resistance, chemical resistance, etc., polyester resins have been widely used for automobile parts, electric and electronic parts, household utensils, etc. From the viewpoints of weight reduction and cost reduction, thinning of those parts is ongoing. In order to satisfy the practical strength even for a thin molding, reinforcement has been devised by using a resin composition reinforced with glass fiber or the like, and arranging many ribs or bosses in a molding.

However, ribs or bosses arranged on a molding allow sink marks to stand out, spoiling the appearance in some cases.

In order to remedy such a problem, in Patent Literatures 1 and 2, a method is proposed in which crystallinity is suppressed by addition of amorphous polyamide or low-crystalline polyamide to crystalline polyamide and glass fiber, and sink marks are remedied by further addition of spherical filler for suppression of shrinkage in the thickness direction. However, addition of the amorphous component and spherical filler lowers the deflection ratio, causing a problem of insufficient toughness. Further, in Patent Literature 3, a method is proposed in which toughness is imparted by addition of glass having a modified cross-section, an olefin resin, and spherical and/or amorphous inorganic filler to a combination of crystalline polyamide and amorphous or low-crystalline polyamide, and further addition of an olefin elastomer thereto. However, the literature does not mention sink marks. Further, in Patent Literature 4, a polyester resin composition obtained by blending a combination of a polybutylene terephthalate resin and an aromatic polycarbonate resin or a polyethylene terephthalate resin with a material for improving impact resistance such as elastomer, an inorganic filler, an aromatic polyvalent carboxylic acid ester, and an epoxy compound is proposed. However, the literature does not mention sink marks, and there exists a problem that the aromatic polycarboxylic acid ester oozes out on the surface of a molding.

CITATION LIST

Patent Literature

PTL 1: Japanese Patent Laying-Open No. 2009-7482
PTL 2: Japanese Patent Laying-Open No. 2013-203869
PTL 3: Japanese Patent No. 5407530
PTL. 4: Japanese Patent No. 3933838

SUMMARY OF INVENTION

Technical Problem

An object of the present invention is to provide a polyester resin composition excellent in heat resistance, capable of imparting toughness to a molding while remedying sink marks.

Solution to Problem

The present inventors have completed the present invention as a result of extensive studies on the constitution and properties of a polyester resin composition in order to solve the problem described above, based on the founding that the problem can be solved by appropriate amounts of specific resins contained, with an appropriate adjustment of ratio of each component.

In other words, the present invention has the following constitution.

[1] A polyester resin composition comprising 18 to 35 parts by mass of a polybutylene terephthalate resin (A), 10 to 25 parts by mass of a polyethylene terephthalate resin (B), 10 to 20 parts by mass of a thermoplastic polyester elastomer (C), 0.5 to 5 parts by mass of an epoxy group-containing ethylene copolymer (D), 12 to 20 parts by mass of a spherical and/or amorphous inorganic filler (E), 10 to 35 parts by mass of a glass fiber reinforcing material (F), 0 to 10 parts by mass of a polycarbonate resin (G), and 0 to 2 parts by mass of a transesterification inhibitor (H).

[2] The polyester resin composition described in [1], further comprising 4 to 8 parts by mass of a copolymerized polyethylene terephthalate resin (I) and/or a copolymerized polybutylene terephthalate resin (J).

[3] The polyester resin composition described in [1] or [2], wherein a molding obtained by injection molding of the polyester resin composition (having a length of 45 mm, a width of 100 mm, and a thickness of 2 mm (a side part of 100 mm has a wall with a height of 6 mm, having a rib part with a length of 14 mm, a height of 2 mm, and a thickness of 1 mm)) at a cylinder temperature of 270° C. and a mold temperature of 80° C. has a sink mark with a depth of 3.0 μm or less on the backside of the rib part.

Advantageous Effects of Invention

According to the present invention, a polyester resin composition excellent in heat resistance, capable of imparting toughness to a molding while remedying sink marks can be provided.

DESCRIPTION OF EMBODIMENTS

Figure 1:
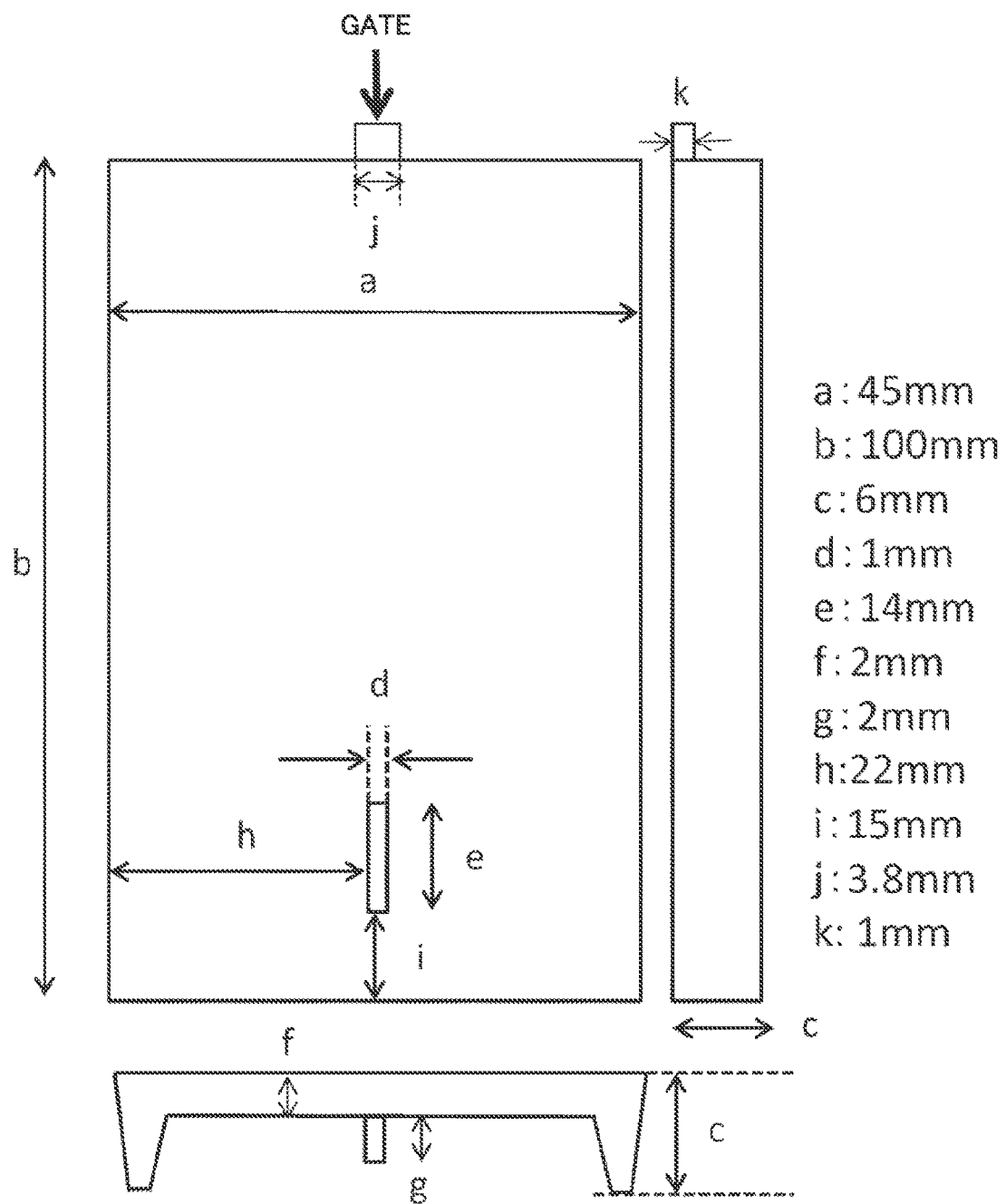
FIG. 1 is a schematic view of a molding for use in evaluation on sink marks in Examples of the present invention, viewed from three directions.

The present invention is specifically described as follows.
Unless otherwise specified, the content (blending amount) of each component in a polyester resin composition is expressed as an amount (parts by mass) relative to 100 parts by mass of a polyester resin composition. The blending amount (blending ratio) of each component represents the content (content ratio) in the polyester resin composition.

Polybutylene terephthalate resin (A) in the present invention is a main component resin among all of the polyester resins in the resin composition of the present invention. It is preferable that polybutylene terephthalate resin (A) has the highest content among all the polyester resins. Polybutylene terephthalate resin (A) is not particularly limited, and a homopolymer formed of terephthalic acid and 1,4-butanediol is preferably used. Based on 100 mol % of all the acid components constituting polybutylene terephthalate resin (A) and 100 mol % of all the glycol components, about up to 5% of other components may be copolymerized, within a range where moldability, crystallinity, surface gloss, etc., are not impaired. Examples of the other components may include components for use in copolymerized polybutylene terephthalate resin (J) described below.

As a measure of the molecular weight of polybutylene terephthalate resin (A), the reduced viscosity (0.1 g of a sample is dissolved in 25 ml of a mixed solvent of phenol/tetrachloroethane (mass ratio: 6/4) for measurement at 30° C. with use of an Ubbelohde viscosity tube) is preferably in the range of 0.6 to 0.9 dl/g, more preferably in the range of 0.7 to 0.8 dl/g. With a reduced viscosity of less than 0.6 dl/g, the toughness of resin significantly decreases, and further, burrs tend to occur due to too high fluidity. On the other hand, with a reduced viscosity of more than 0.9 dl/g, fluidity of the present composition system may decrease.

The content of polybutylene terephthalate resin (A) is 18 to 35 parts by mass, preferably 20 to 33 parts by mass. Containing (blending) polybutylene terephthalate resin (A) within the range allows various properties to be satisfied.

Polyethylene terephthalate resin (B) in the present invention is basically a homopolymer of ethylene terephthalate units. Further, based on 100 mol % of all the acid components constituting polyethylene terephthalate resin (B) and 100 mol % of all the glycol components, about up to 5% of other components may be copolymerized within a range where various properties are not impaired Examples of the other components may include components for use in copolymerized polyethylene terephthalate resin (I) described below. As the other components, diethylene glycol produced through condensation of ethylene glycol during polymerization is also included.

As a measure of the molecular weight of polyethylene terephthalate resin (B), the reduced viscosity (0.1 g of a sample is dissolved in 25 ml of a mixed solvent of phenol/tetrachloroethane (mass ratio 6/4) for measurement at 30° C. with use of an Ubbelohde viscosity tube) is preferably 0.4 to 1.0 dl/g, more preferably 0.5 to 0.9 dl/g. With a reduced viscosity of less than 0.4 dl/g, the strength of resin may decrease, and with a reduced viscosity of more than 1.0 dl/g, the fluidity of resin may decrease.

The content of polyethylene terephthalate resin (B) is 10 to 25 parts by mass, preferably 13 to 22 parts by mass. Containing (blending) polyethylene terephthalate resin (B) within the range allows various properties to be satisfied.

It is preferable that thermoplastic polyester elastomer (C) in the present invention have a hard segment formed of crystalline polyester including an aromatic dicarboxylic acid and an aliphatic or alicyclic glycol, and at least one soft segment selected from the group consisting of an aliphatic polyether, an aliphatic polyester, and an aliphatic polycarbonate, as main constituents (70 mass % or more).

In thermoplastic polyester elastomer (C), the aromatic dicarboxylic acid constituting the hard segment polyester is preferably terephthalic acid or naphthalene dicarboxylic acid. Examples of other acid components include an aromatic dicarboxylic acid such as diphenyl dicarboxylic acid, isophthalic acid and 5-sodium sulfoisophthalic acid, an alicyclic dicarboxylic acid such as cyclohexane dicarboxylic acid and tetrahydrophthalic anhydride, and an aliphatic dicarboxylic acid such as succinic acid, glutaric acid, adipic acid, azelaic acid, sebacic acid, dodecanedioic acid, a dimer acid and a hydrogenated dimer acid. These are used within a range where the melting point of the resin is not significantly lowered, and the amount thereof is less than 30 mol % of the total acid components, preferably less than 20 mol %.

Further, in thermoplastic polyester elastomer (C), as the aliphatic or alicyclic dicarboxylic acid constituting the hard segment polyester, typical aliphatic or alicyclic glycols are widely used without particular limitation, and alkylene glycols having 2 to 8 carbon atoms are primarily desirable. Specific examples thereof include ethylene glycol, 1,3-propylene glycol, 1,4-butanediol, 1,6-hexanediol and 1,4-cyclohexanedimethanol, 1,4-butanediol and 1,4-cyclohexanedimethanol are most preferred.

As a component constituting the hard segment polyester described above, one having a butylene terephthalate unit or a butylene naphthalate unit is preferred from the viewpoints of physical properties, moldability and cost performance.

An aromatic polyester suitable as a polyester constituting the hard segment in thermoplastic polyester elastomer (C) can be easily obtained according to a typical production method of a polyester. It is preferable that such a polyester have a number average molecular weight of 10000 to 40000.

Examples of the aliphatic polyether as soft segment component in thermoplastic polyester elastomer (C) include a poly(alkylene oxide) glycol such as poly(ethylene oxide) glycol, poly(propylene oxide) glycol, poly(tetramethylene oxide) glycol, poly(hexamethylene oxide) glycol, a copolymer of ethylene oxide and propylene oxide, an ethylene oxide addition polymer of poly(propylene oxide) glycol, and a copolymer of ethylene oxide and tetrahydrofuran.

Among the aliphatic polyethers described above, poly(tetramethylene oxide) glycol, an ethylene oxide adduct of poly(propylene oxide)glycol, and a copolymer glycol of ethylene oxide and tetrahydrofuran are preferred, and poly(tetramethylene oxide) glycol and an ethylene oxide adduct of poly(propylene oxide) glycol are more preferred. It is preferable that the number average molecular weight of these soft segments be about 300 to 6000 in a copolymerized state.

The amount of the soft segment copolymerized in thermoplastic polyester elastomer (C) is preferably 10 to 85 mass %, more preferably 20 to 85 mass %.

Thermoplastic polyester elastomer (C) may be produced by a conventionally known method. For example, any of the following methods may be employed: a method of transesterifying a lower alcohol diester of dicarboxylic acid, an excess amount of a low molecular weight glycol, and a soft segment component in the presence of a catalyst, and then polycondensating the resulting reaction product; and a method of esterifying a dicarboxylic acid, an excess amount of a glycol, and a soft segment component in the presence of a catalyst, and then polycondensating the resulting reaction product. The content of component (C) is 10 to 20 parts by mass, preferably 10 to 18 parts by mass, more preferably 10 to 17 parts by mass, and still more preferably 11 to 15 parts by mass. With a content of less than 10 parts by mass, a sufficient total amount of energy absorbed (S—S area in bending) cannot be obtained in bending test, resulting in insufficient toughness, which is not preferred. Even with addition of more than 20 parts by mass, a higher effect is obtained and heat resistance decreases.

It is preferable that epoxy-containing ethylene copolymer (D) in the present invention be an epoxy group-containing ethylene copolymer formed of 50 to 99 mass % of an ethylene unit, 0.1 to 30 mass % (preferably 0.5 to 20 mass %) of an unsaturated carboxylic acid glycidyl ester unit or an unsaturated glycidyl ether unit, and 0 to 49 mass % of an ethylene-based unsaturated ester compound unit.

In epoxy group-containing ethylene copolymer (D), examples of the unsaturated carboxylic acid glycidyl ester unit and the unsaturated glycidyl ether unit include glycidyl acrylate, glycidyl methacrylate, itaconic acid glycidyl ester, acrylic acid glycidyl ester, allyl glycidyl ether, 2-methylallyl glycidyl ether and styrene-p-glycidyl ether.

Further, in epoxy group-containing ethylene copolymer (D), it is also possible to use a ternary or more multicomponent copolymer of an unsaturated carboxylic acid glycidyl ester or unsaturated glycidyl ether, ethylene and an ethylene-based unsaturated ester compound. Examples of the ethylene-based unsaturated ester compound include a carboxylic acid vinyl ester such as vinyl acetate, vinyl propionate, methyl acrylate, ethyl acrylate, butyl acrylate, methyl methacrylate, ethyl methacrylate, and butyl methacrylate, and an $\alpha, \beta$-unsaturated carboxylic acid alkyl ester. In particular, vinyl acetate, methyl acrylate, and ethyl acrylate are preferred.

Examples of epoxy group-containing ethylene copolymer (D) described above include a copolymer formed of ethylene units and glycidyl methacrylate units, a copolymer formed of ethylene units, glycidyl methacrylate units and methyl acrylate units, a copolymer formed of ethylene units, glycidyl methacrylate units and methylacrylate units, a copolymer formed of ethylene units, glycidyl methacrylate units and vinyl acetate units.

The content of epoxy group-containing ethylene copolymer (D) is 0.5 to 5 parts by mass, preferably 1 to 4 parts by mass. With a content of less than 0.5 parts by mass, a sufficient total amount of energy absorbed (S-S area in bending) cannot be obtained in bending test, resulting in insufficient toughness, which is not preferred. With an addition of more than 5 parts by mass, good appearance is not obtained, which is not preferred. Further, since use of thermoplastic polyester elastomer (C) and epoxy-containing ethylene copolymer (D) in combination enhances the effect for improving toughness, a polyester composition having sufficient toughness can be obtained, while suppressing decrease in toughness resulting from containing spherical and/or amorphous inorganic filler (E), and remedying sink marks.

Spherical or amorphous inorganic filler (E) in the present invention is an inorganic filler having a spherical and/or amorphous shape rather than a fibrous or tabular shape. The spherical and/or amorphous shape has a major/minor diameter (major diameter/minor diameter), a flatness (minor diameter/thickness), and an aspect ratio (projected area diameter/thickness) each of 3.0 or less, preferably 2.0 or less. With these values of more than 3.0, the weld strength tends to decrease.

Specific examples thereof include glass beads, silica, calcium carbonate, wollastonite, barium sulfate, small acicular wollastonite, and particulate aluminum borate, though not limited thereto. Further, even those treated with a known coupling agent may be used without any problem. Any particle size of spherical and/or amorphous inorganic filler (E) may be used without particular limitation, and, for example, a particle size of 1 to 80 μm is preferred, and a particle size of 2 to 30 μm is more preferred.

The content of spherical or amorphous inorganic filler (E) is 12 to 20 parts by mass, preferably 13 to 18 parts by mass. Containing (blending) spherical or amorphous inorganic filler (E) within the range allows various properties to be satisfied, including remedy of sink marks, in particular.

As glass fiber reinforcing material (F) in the present invention, a milled fiber that is a short glass fiber having an average fiber diameter of about 4 to 20 μm and a cut length of about 30 to 150 μm, and a chopped strand glass fiber having an average fiber diameter of about 1 to 20 μm and a cut length of about 1 to 20 mm may be preferably used. The glass fiber for use may have a circular cross-section or a non-circular cross-section. As the glass fiber having a circular cross-section, a very common one having an average fiber diameter of about 4 to 20 μm and a cut length of about 2 to 6 mm may be used. Examples of the glass fiber having a non-circular cross-section include one having a cross-section perpendicular to the length direction of the fiber in an approximately elliptical shape, an approximately oval shape, or an approximately cocoon-like shape, which has a flatness of preferably 1.3 to 8. The flatness is defined as follows. A rectangle having the smallest area, which circumscribes a cross section perpendicular to the longitudinal direction of the glass fiber, is assumed. The major diameter is the length of the long side of the rectangle, and the minor diameter is the length of the short side. The ratio of major diameter/minor is the flatness. The thickness of the glass fiber is not particularly limited, and one having a minor diameter of 1 to 20 μm and a major diameter of about 2 to 100 μm may be used. These glass fibers may be used alone or in combination of two or more.

The average fiber diameter and the average fiber length of the glass fiber may be measured by observation through an electron microscope.

These glass fibers are treated with a conventionally known coupling agent such as an organic silane compound, an organic titanium compound, an organic borane compound and an epoxy compound in advance for preferred use.

The content of glass fiber reinforcing material (F) is 10 to 35 parts by mass, preferably 13 to 32 parts by mass. Containing (blending) glass fiber reinforcing material (F) within the range allows various properties to be satisfied.

The polycarbonate in polycarbonate resin (G) of the present invention may be produced by a solvent method, i.e., a reaction between dihydric phenol and a carbonate precursor such as phosgene in the presence of a known acid acceptor and molecular weight modifier in a solvent such as methylene chloride, or a transesterification reaction between a dihydric phenol and a carbonate precursor such as diphenyl carbonate Examples of the dihydric phenol preferably used include bisphenols, in particular, 2,2-bis (4-hydroxyphenyl) propane. i.e., bisphenol A. Further, a part or all of bisphenol A may be replaced with another dihydric phenol. Examples of the dihydric phenol other than bisphenol A include a compound such as hydroquinone, 4,4-dihydroxydiphenyl and bis(4-hydroxyphenyl)alkane, and halogenated bisphenols such as bis(3,5-dibromo-4-hydroxyphenyl)propane and bis(3, 5-dichloro-4-hydroxyphenyl)propane. The polycarbonate may be a homopolymer of one dihydric phenol or a copolymer of two or more dihydric phenols. As polycarbonate resin (G), a resin formed of polycarbonate alone is preferably used. Polycarbonate resin (G) may be a resin obtained by copolymerizing a component other than polycarbonate (e.g. polyester component) within a range where the effect of the present invention is not impaired (20 mass % or less).

It is preferable that polycarbonate resin (G) for use in the present invention have high fluidity, in particular. The melt volume rate (unit: $cm^3/10$ min) thereof measured under a load of 1.2 kg is preferably 20 to 100, more preferably 25 to 95, and still more preferably 30 to 90. With a melt volume rate of less than 20, the fluidity is significantly reduced, resulting in decrease in strand stability and deterioration of moldability in some cases. With a melt volume rate of more than 100, deterioration of physical properties may be caused due to too low molecular weight and problems such as gas generation tend to be caused due to decomposition.

The content of polycarbonate resin (G) for use in the present invention is 0 to 10 parts by mass. Polycarbonate resin (G) may not to be contained, but containing polycarbonate resin (G) allows sink marks to further decrease. In the case where polycarbonate resin (G) is contained, the content is preferably 5 to 9 parts by mass. A content of more than 10 parts by mass is not preferred, because the molding cycle is deteriorated due to decrease in crystallinity, and appearance defects tend to occur due to decrease in fluidity.

As the name implies, transesterification inhibitor (H) in the present invention is a stabilizer that prevents the transesterification reaction of a polyester resin. In an alloy or the like between polyester resins, transesterification occurs to no small extent due to heat history, no matter how optimized the production conditions are. With a very large extent, the desired characteristics of the alloy cannot be obtained. In particular, transesterification between polybutylene terephthalate and polycarbonate often occurs, and in that case, the crystallinity of polybutylene terephthalate is significantly reduced, which is not preferable. In the present invention, by addition of component (H), the transesterification reaction between polybutylene terephthalate resin (A) and polycarbonate resin (G) is particularly prevented, so that appropriate crystallinity can be maintained.

As transesterification inhibitor (H), a phosphorus compound having a catalyst deactivation effect on the polyester resin may be preferably used, and for example, "ADEKA STAB AX-71" manufactured by ADEKA Corporation may be used.

The content of transesterification inhibitor (H) for use in the present invention is 0 to 2 parts by mass. In the case where polycarbonate resin (G) is contained, it is preferable that the content of transesterification inhibitor (H) be 0.05 to 2 parts by mass. With a content of transesterification inhibitor (H) of less than 0.05 parts by mass, the desired transesterification prevention performance may not be exhibited in many cases. To the contrary, even with an addition of more than 2 parts by mass, the effect is not improved so much, and may cause increases of gas in some cases.

It is preferable that copolymerized polyethylene terephthalate resin (I) and/or polybutylene terephthalate resin (J) in the present invention be blended in order to suppress appearance defects due to floating of glass fibers or the like and poor mold transfer properties.

Copolymerized polyethylene terephthalate resin (I) in the present invention is a resin that contains 40 mol % or more of ethylene glycol and 80 to 180 mol % of terephthalic acid and ethylene glycol in total, based on 100 mol % of all the acid components and 100 mol % of all the glycol components. The resin may contain a copolymerization component that is at least one or more selected from the group consisting of isophthalic acid, sebacic acid, adipic acid, trimellitic acid, 2,6-naphthalenedicarboxylic acid, diethylene glycol, neopentyl glycol, 1,4-cyclohexanedimethanol, 1,4-butanediol, 1,2-propanediol, 1,3-propanediol, and 2-methyl-1,3-propanediol, being preferably amorphous. Above all, neopentyl glycol or a combination of neopentyl glycol and isophthalic acid is preferred, from the viewpoint of various properties as copolymerization component. It is preferable that the content of 1,4-butanediol as a copolymerization component be 20 mol % or less.

The copolymerization ratio of neopentyl glycol is preferably 20 to 60 mol %, more preferably 25 to 50 mol %, based on 100 mol % of all the glycol components constituting copolymerized polyethyleneterephthalate resin (I).

The copolymerization ratio of isophthalic acid is preferably 20 to 60 mol %, more preferably 25 to 50 mol %, based on 100 mol % of all the acid components constituting copolymerized polyethylene terephthalate resin (I).

As a measure of the molecular weight of copolymerized polyethylene terephthalate resin (I), the reduced viscosity (0.1 g of a sample is dissolved in 25 ml of a mixed solvent of phenol/tetrachloroethane (mass ratio: 6I4) for measurement at 30° C. with use of an Ubbelohde viscosity tube) is preferably in the range of 0.4 to 1.5 dl/g, more preferably in the range of 0.4 to 1.3 dl/g, though being slightly different depending on the specific copolymerization composition. With a reduced viscosity of less than 0.4 dl/g, the toughness may decrease, and with a reduced viscosity of more than 1.5 dl/g, fluidity may decrease.

Copolymerized polybutylene terephthalate resin (J) in the present invention is a resin that contains 80 mol % or more of 1,4-butanediol and 120 to 180 mol % of terephthalic acid and 1,4-butanediol in total, based on 100 mol % of the total acid components and 100 mol % of the total glycol components. As a copolymerization component, at least one or more selected from the group consisting of isophthalic acid, sebacic acid, adipic acid, trimellitic acid, 2,6-naphthalenedicarboxylic acid, ethylene glycol, diethylene glycol, neopentyl glycol, 1,4-cyclohexanedimethanol, 1,2-propanediol, 1,3-propanediol, and 2-methyl-1,3-propanediol may be contained. Among them, isophthalic acid is preferred as the copolymerization component, and the copolymerization ratio is preferably 20 to 80 mol %, more preferably 20 to 60 mol %, based on 100 mol % of the total acid components constituting copolymerized polybutylene terephthalate resin (J). With a copolymerization ratio of less than 20 mol %, the transferability to a mold is poor, so that a sufficient appearance tends to be hardly obtained. With an amount of copolymerization of more than 80 mol %, the molding cycle and releasability may decrease in some cases.

As a measure of the molecular weight of copolymerized polybutylene terephthalate resin (J), the reduced viscosity (0.1 g of a sample is dissolved in 25 ml of a mixed solvent of phenol/tetrachloroethane (mass ratio: 6/4) for measurement at 30° C. with use of an Ubbelohde viscosity tube) is preferably in the range of 0.4 to 1.5 dl/g, more preferably in the range of 0.4 to 1.3 di/g, though being slightly different depending on the specific copolymerization composition. With a reduced viscosity of less than 0.4 dl/g, the toughness may decrease, and with a reduced viscosity of more than 1.5 dl/g, fluidity may decrease.

It is preferable that the content of copolymerized polyethylene terephthalate resin (I) and/or polybutylene terephthalate resin (J) be 4 to 8 parts by mass. In the case where both of copolymerized polyethylene terephthalate resin (I) and polybutylene terephthalate resin (J) are contained, the total content meets the condition. With a content of less than 4 parts by mass, the effect of suppressing appearance defects due to floating of glass fibers or the like and transfer molding failure cannot be sufficiently obtained. With a content of more than 8 parts by mass, the molding cycle is prolonged, though the appearance of a molding is improved.

The polyester resin composition of the present invention may contain various known additives on an as needed basis, within a range where properties in the present invention are not impaired. Examples of the known additives include a colorant such as a pigment, a mold release agent, a heat resistance stabilizer, an antioxidant, an ultraviolet absorber, a light stabilizer, a plasticizer, a modifier, an antistatic agent, a flame retardant, and a dye. These various additives may be contained in a total amount of up to 5 parts by mass, based on 100 parts by mass of the polyester resin composition. In other word, it is preferable that the total amount of (A), (B), (C), (D), (E), (F), (G), (H), (I) and (J) be 95 to 100 parts by mass, in 100 parts by mass of the polyester resin composition.

Examples of the release agent include a long-chain fatty acid or an ester thereof and a metal salt thereof, an amide compound, a polyethylene wax, silicon, and polyethylene oxide. As the long-chain fatty acid, one having 12 or more carbon atoms is particularly preferred, and examples thereof include stearic acid, 12-hydroxystearic acid, behenic acid, and montanic acid. A part or the whole of carboxylic acid may be esterified with monoglycol or polyglycol, or may form a metal salt. Examples of the amide compound include ethylene bis-terephthalamide and methylene bis-stearylamide. These mold release agents may be used alone or as a mixture.

A production method of the polyester resin composition of the present invention includes mixing each of the components and various stabilizers, pigments, etc., on an as needed basis, and melt-kneading the mixture. The melt-kneading method may be any method well-known to those skilled in the art with use of a single-screw extruder, a twin-screw extruder, a pressurizing kneader, a Banbury mixer, or the like. In particular, use of a twin-screw extruder is preferred. Typical melt-kneading conditions include a cylinder temperature of twin-screw extruder of 240 to 280° C., and a kneading time of 2 to 15 minutes.

A molding (having a length of 45 mm, a width of 100 mm, and a thickness of 2 mm (a side part of 100 mm has a wall with a height of 6 mm, having a rib part with a length of 14 mm, a height of 2 mm, and a thickness of 1 mm)) obtained by injection molding of the polyester resin composition of the present invention at a cylinder temperature of 270° C. and a mold temperature of 80° C. has a sink mark with a controlled depth of 3.0 μm or less on the backside of the rib part. The details of the molding are as shown in FIG. 1.

EXAMPLES

The present invention will be specifically described with reference to Examples as follows, though the present invention is not limited thereto. The measured values described in Examples were measured by the following methods, using a molding formed by an injection molding machine (trade name "EC100N", manufactured by Shibaura Machine Co., Ltd.) under conditions of a cylinder temperature of 270° C., and a mold temperature of 80° C.

(1) Bending Strength, Bending Modulus, Bending Deflection Ratio, and S-S Area in Bending The measurement was performed in accordance with ISO-178 The S-S area in bending was calculated by totaling the bending strength at every bending deflection rate of 0.0196%.

(2) Heat Distortion Temperature

A multipurpose test piece in ISO-3167 was formed. In accordance with ISO-75, the heat distortion temperature of the multipurpose test piece was measured under a high load (1.80 MPa).

(3) Appearance of Molding

A molding having a length of 100 mm, a width of 100 mm and a thickness of 2 mm was injection molded under the conditions at a cylinder temperature of 270° C. and a mold temperature of 80° C. within an injection speed range with a filling time of 1 second. The appearance of the molding was visually observed. Marks "⊚", "○" and "Δ" are passing marks.

⊚: Good. The surface is glossy, having no appearance defect at all.

○: Good. Almost no appearance defect due to floating of glass fiber, inorganic tiller or the like is observed on the surface.

Δ: in a part (particularly at an end or in the vicinity of a molding), some appearance defects occur.

x: Appearance defects occur on the whole of a molding.

(4) Evaluation on Sink Mark

A backside, which is a surface opposite to a ribbed part, of a molding (having a length of 45 mm, a width of 100 mm, and a thickness of 2 mm (a side part of 100 mm has a wall with a height of 6 mm, having the rib part with a length of 14 mm, a height of 2 mm, and a thickness of 1 mm)) obtained by injection molding of the polyester resin composition at a cylinder temperature of 270° C. and a mold temperature of 80° C. was observed from the backside of the molding with a laser microscope (trade name: "Color 3D Laser Microscope VK-9700, manufactured by KEYENCE Corporation") at a magnification of 10 times, so as to measure the difference in surface height between the rib part and a ribless part (depth of sink mark). A difference in surface height of less than 2.5 μm was rated as "⊚", a difference of 2.5 or more and 3.0 μm or less was rated as "○", and a difference of more than 3.0 μm was rated as failure "x". The shape of the molding is shown in FIG. 1.

The blending components for use in Examples and Comparative Examples are as follows.

Polybutylene Terephthalate Resin (A)

A: manufactured by Toyobo Co., Ltd., reduced viscosity: 0.75 dl/g

Polyethylene Terephthalate Resin (B)

B: manufactured by Toyobo Co, Ltd., reduced viscosity 0.63 dl/g

Thermoplastic Polyester Elastomer (C)

C: Using dimethyl terephthalate, 1,4-butane diol, and poly(tetramethylene oxide) glycol having a number average molecular weight of 1000 as raw materials, a thermoplastic polyester elastomer containing 75 mass % of polybutylene terephthalate and 25 mass % of poly(tetramethylene oxide) glycol was synthesized.

Epoxy-Containing Ethylene Copolymer (D)

D: "Bond First 7M" manufactured by Sumitomo Chemical Co, Ltd., ethylene/methyl acrylate/glycidyl methacrylate copolymer (mass ratio: 64/30/6), glass transition point: −33° C., glycidyl methacrylate content: 6%

Inorganic Filler (E)

E-1: Calcium carbonate: "Whiten P-30" manufactured by Shiraishi Calcium Kaisha. Ltd., amorphous filler E-2: Glass beads: "EGB731B" manufactured by Potters-Ballotini Co. Ltd, spherical filler E-3 Mica: "GM-6" manufactured by Kinsei Matec Co., Ltd., tabular filler Glass Fiber Reinforcing Material (F)

F: "T-120H" manufactured by Nippon Electric Glass Co., Ltd.

Polycarbonate Resin (G)

G: "CALIBRE 200-80" manufactured by Sumika Styron Polycarbonate Ltd., melt volume rate (300° C., load: 1.2 kg): 80 cm$^3$/10 min Transesterification Inhibitor (H)
H: "ADEKA STAB AX-71" manufactured by ADEKA Corporation Copolymerized Polyethylene Terephthalate Resin (I)
I: Copolymer having a composition ratio TPA//EG/NPG 100//70/30 mol %, manufactured by Toyobo Co., Ltd., prototype of Toyobo Byron (registered trademark), reduced viscosity: 0.83 dl/g Copolymerized Polybutylene Terephthalate Resin (J)
J: Copolymer having a composition ratio TPA/IPA//1,4-BD=70/30//100 mol %, manufactured by Toyobo Co., Ltd., prototype of Toyobo Byron (registered trademark), reduced viscosity 0.73 dl/g (The abbreviations indicate the followings, respectively. TPA: terephthalic acid, EG: ethylene glycol, NPG: neopentyl glycol. IPA: isophthalic acid, 1,4-BD: 1,4-butanediol component)

Examples 1 to 13, and Comparative Examples 1 to 8

The polyester resin compositions in Examples and Comparative Examples prepared by weighing the raw materials described above according to the blending ratio (parts by mass) shown in Tables 1 and 2 were melt-kneaded by a twin-screw extruder having a diameter of 35 mm (manufactured by Shibaura Machine Co Ltd.) at a cylinder temperature of 270° C., and a screw rotation speed of 200 rpm. The raw materials other than reinforcing materials were fed from a hopper into the twin-screw extruder, and inorganic filler (E) and glass fiber reinforcing material (F) were fed from separate side feeders through a vent port. The resulting pellets of polyester resin composition were dried, and then formed into samples for various evaluations by an injection molding machine. The evaluation results are shown in Tables 1 and 2.

TABLE 1

| | Type | Unit | | Example 1 | Example 2 | Example 3 | Example 4 | Example 5 | Example 6 | Example 7 |
|---|---|---|---|---|---|---|---|---|---|---|
| Composition | Polybutylene terephthalate resin (A) | Parts by mass | A | 33 | 32 | 33 | 31 | 28 | 28.6 | 26.3 |
| | Polyethylene terephthalate resin (B) | Parts by mass | B | 22 | 21 | 22 | 20 | 18 | 18.2 | 17 |
| | Thermoplastic polyester elastomer (C) | Parts by mass | C | 13 | 15 | 11 | 12 | 12 | 13 | 12 |
| | Epoxy-containing ethylene copolymer (D) | Parts by mass | D | 2 | 2 | 4 | 2 | 2 | 2 | 1.5 |
| | Inorganic filler (E) | Parts by mass | E-1 E-2 E-3 | 15 | 15 | 15 | 15 | 15 | 15 | 15 |
| | Glass fiber reinforcing material (F) | Parts by mass | F | 15 | 15 | 15 | 20 | 25 | 15 | 20 |
| | Polycarbonate resin (G) | Parts by mass | G | | | | | | 8 | 8 |
| | Transesterification inhibitor (H) | Parts by mass | H | | | | | | 0.2 | 0.2 |
| | Copolymerized polyethylene terephthalate resin (I) | Parts by mass | I | | | | | | | |
| | Copolymerized polybutylene terephthalate resin (J) | Parts by mass | J | | | | | | | |
| Properties | Bending strength | MPa | | — | 133 | 133 | 138 | 161 | 176 | 139 | 158 |
| | Bending modulus | GPa | | — | 5.2 | 5.2 | 4.9 | 6.9 | 8.2 | 5.6 | 7.0 |
| | Bending deflection rate | % | | — | 3.9 | 3.9 | 3.6 | 3.4 | 3.2 | 3.6 | 3.0 |
| | Total amount of energy absorbed in bending test/S-S area in bending | MPa | | — | 162 | 159 | 151 | 166 | 173 | 162 | 157 |
| | Heat distortion temperature (high load: 1.80 MPa) | ° C. | | — | 189 | 189 | 191 | 196 | 197 | 178 | 185 |
| | Appearance of molding (visual observation) | — | | ⊚ | ⊚ | ⊚ | ○ | ○ | ⊚ | ○ |
| | Evaluation on sink mark | Determination μm(depth of sink mark) | | ○ 2.9 | ○ 2.9 | ○ 2.8 | ○ 2.7 | ○ 2.7 | ○ 2.6 | ○ 2.5 |

| | Type | Unit | | Example 8 | Example 9 | Example 10 | Example 11 | Example 12 | Example 13 |
|---|---|---|---|---|---|---|---|---|---|
| Composition | Polybutylene terephthalate resin (A) | Parts by mass | A | 24.3 | 21.8 | 22 | 21.3 | 33 | 25 |
| | Polyethylene terephthalate resin (B) | Parts by mass | B | 15 | 14 | 14 | 13 | 22 | 16 |
| | Thermoplastic polyester elastomer (C) | Parts by mass | C | 12 | 12 | 12 | 12 | 13 | 18 |
| | Epoxy-containing ethylene copolymer (D) | Parts by mass | D | 1.5 | 1 | 1 | 1.5 | 2 | 2 |
| | Inorganic filler (E) | Parts by mass | E-1 E-2 E-3 | 15 | 15 | 15 | 15 | 15 | 15 |
| | Glass fiber reinforcing material (F) | Parts by mass | F | 25 | 30 | 30 | 25 | 15 | 25 |
| | Polycarbonate resin (G) | Parts by mass | G | 7 | 6 | | 7 | | |

TABLE 1-continued

| | | | | | | | | | | |
|---|---|---|---|---|---|---|---|---|---|---|
| | Transesterification inhibitor (H) | Parts by mass | H | | 0.2 | 0.2 | | 0.2 | | |
| | Copolymerized polyethylene terephthalate resin (I) | Parts by mass | I | | | | 6 | | | |
| | Copolymerized polybutylene terephthalate resin (J) | Parts by mass | J | | | | | 5 | | |
| Properties | Bending strength | MPa | | — | 175 | 182 | 181 | 174 | 140 | 175 |
| | Bending modulus | GPa | | — | 8.3 | 9.8 | 10.6 | 8.3 | 6.0 | 7.5 |
| | Bending deflection rate | % | | — | 3.0 | 2.8 | 2.7 | 3.2 | 3.4 | 3.3 |
| | Total amount of energy absorbed in bending test/S-S area in bending | MPa | | — | 158 | 161 | 150 | 164 | 154 | 180 |
| | Heat distortion temperature (high load: 1.80 MPa) | °C. | | — | 191 | 197 | 189 | 187 | 184 | 197 |
| | Appearance of molding (visual observation) | | | — | ○ | Δ | ○ | ○ | ○ | ○ |
| | Evaluation on sink mark | Determination | | | ○ | ◎ | ◎ | ◎ | ○ | ○ |
| | | μm(depth of sink mark) | | | 2.5 | 1.6 | 1.7 | 2.2 | 2.9 | 2.7 |

TABLE 2

| | Type | Unit | | Comparative Example 1 | Comparative Example 2 | Comparative Example 3 | Comparative Example 4 |
|---|---|---|---|---|---|---|---|
| Composition | Polybutylene terephthalate resin (A) | Parts by mass | A | 42 | 33 | 33 | 36 |
| | Polyethylene terephthalate resin (B) | Parts by mass | B | 28 | 22 | 22 | 24 |
| | Thermoplastic polyester elastomer (C) | Parts by mass | C | | 15 | | 6.5 |
| | Epoxy-containing ethylene copolymer (D) | Parts by mass | D | | | 15 | 3.5 |
| | Inorganic filler (E) | Parts by mass | E-1 | 15 | 15 | 15 | 15 |
| | | | E-2 | | | | |
| | | | E-3 | | | | |
| | Glass fiber reinforcing material (F) | Parts by mass | F | 15 | 15 | 15 | 15 |
| | Polycarbonate resin (G) | Parts by mass | G | | | | |
| | Transesterification inhibitor (H) | Parts by mass | H | | | | |
| Properties | Bending strength | MPa | | — | 135 | 136 | 113 | 136 |
| | Bending modulus | GPa | | — | 6.2 | 4.6 | 4.4 | 5.3 |
| | Bending deflection rate | % | | — | 2.6 | 3.5 | 4.0 | 3.2 |
| | Total amount of energy absorbed in bending test/S-S area in bending | MPa | | — | 102 | 146 | 145 | 129 |
| | Heat distortion temperature (high load: 1.80 MPa) | °C. | | — | 195 | 190 | 190 | 190 |
| | Appearance of molding (visual observation) | | | — | ◎ | ○ | ○ | ○ |
| | Evaluation on sink mark | Determination | | | ○ | ○ | ○ | ○ |
| | | μm(depth of sink mark) | | | 2.9 | 2.8 | 2.8 | 2.8 |

| | Type | Unit | | Comparative Example 5 | Comparative Example 6 | Comparative Example 7 | Comparative Example 8 |
|---|---|---|---|---|---|---|---|---|
| Composition | Polybutylene terephthalate resin (A) | Parts by mass | A | 36 | 28.6 | 26.4 | 60 |
| | Polyethylene terephthalate resin (B) | Parts by mass | B | 24 | 18.2 | 16.4 | 25 |
| | Thermoplastic polyester elastomer (C) | Parts by mass | C | 13 | 13 | 13 | |
| | Epoxy-containing ethylene copolymer (D) | Parts by mass | D | 2 | 2 | 2 | |
| | Inorganic filler (E) | Parts by mass | E-1 | 10 | | 15 | |
| | | | E-2 | | | | |
| | | | E-3 | | 15 | | |
| | Glass fiber reinforcing material (F) | Parts by mass | F | 15 | 15 | 15 | 15 |
| | Polycarbonate resin (G) | Parts by mass | G | | 8 | 12 | |

TABLE 2-continued

| | | | | | | | |
|---|---|---|---|---|---|---|---|
| | Transesterification inhibitor (H) | Parts by mass | H | | 0.2 | 0.2 | |
| Properties | Bending strength | MPa | — | 142 | 163 | 136 | 142 |
| | Bending modulus | GPa | — | 5.3 | 8.2 | 5.9 | 4.8 |
| | Bending deflection rate | % | — | 3.8 | 2.7 | 3.2 | 3.8 |
| | Total amount of energy absorbed in bending test/S-S area in bending | MPa | — | 158 | 129 | 131 | 160 |
| | Heat distortion temperature (high load: 1.80 MPa) | ° C. | — | 191 | 193 | 168 | 170 |
| | Appearance of molding (visual observation) | | — | ○ | X | ○ | ◎ |
| | Evaluation on sink mark | Determination | | X | ○ | ○ | X |
| | | μm(depth of sink mark) | | 3.3 | 2.8 | 2.5 | 3.5 |

As shown in Tables 1 and 2, in Examples 1 to 13, due to the compositions according to the present application, sink marks were remedied while maintaining high toughness (total amount of energy absorbed during bending test). Further, the good appearance of moldings was obtained, so that it can be seen that a high heat distortion temperature was achieved.

On the other hand, in Comparative Example 1, since thermoplastic polyester elastomer (C) and epoxy-containing ethylene copolymer (D) were not blended, the toughness was inferior to those in Examples. In Comparative Examples 2 and 3, since only one of thermoplastic polyester elastomer (C) and epoxy-containing ethylene copolymer (D) was blended, the toughness was inferior to those in Examples. In Comparative Example 4, since the content of thermoplastic polyester elastomer (C) was small, the toughness was inferior to those in Examples. In Comparative Example 5, since the content of spherical or amorphous inorganic filler (E) was less than the specified amount, sink marks were inferior to those in Example. In Comparative Example 6, since tabular inorganic filler was contained instead of spherical or amorphous inorganic filler, the appearance of a molding was deteriorated, and the toughness was inferior to those in Examples. In Comparative Example 7, since the blending amount of polycarbonate resin (G) was more than the specified amount, the heat distortion temperature was lower than those in Examples, and the heat resistance was poor. In Comparative Example 8, since spherical or amorphous inorganic filler (E) was not contained, sufficient toughness was achieved without blending thermoplastic polyester elastomer (C) and epoxy-containing ethylene copolymer (D). However, the sink mark was inferior to those in Examples.

It should be considered that the embodiments and Examples disclosed herein are exemplary in all respects and are not restrictive. The scope of the present invention is shown not by the above description but by claims, and is intended to include meanings equivalent to the claims and all modifications within the scope.

INDUSTRIAL APPLICABILITY

The thermoplastic polyester resin composition of the present invention is excellent in heat resistance, capable of imparting toughness to a molding while remedying sink marks, so that the sink marks of a product reinforced with ribs and bosses can be reduced. The thermoplastic polyester resin composition is suitable as housing materials of electrical appliances with emphasis on mechanical properties, weight reduction and design, including, for example, curling irons and dryers.

REFERENCE SIGNS LIST a: Length of short side of bottom: 45 mm
b: Length of long side of bottom: 100 mm
c: Height of wall on long side: 6 mm
d: Rib thickness: 1 mm
e: Rib length: 14 mm
f: Bottom thickness: 2 mm
g: Height of rib part: 2 mm
h: Distance from long side to rib: 22 mm
i: Distance from short side to rib: 15 mm
j: Gate width: 3.8 mm
k: Gate thickness: 1 mm

The invention claimed is:

1. A polyester resin composition comprising 18 to 35 parts by mass of a polybutylene terephthalate resin (A), 10 to 25 parts by mass of a polyethylene terephthalate resin (B), 10 to 20 parts by mass of a thermoplastic polyester elastomer (C), 0.5 to 5 parts by mass of an epoxy group-containing ethylene copolymer (D), 12 to 20 parts by mass of a spherical and/or amorphous inorganic filler (E), 10 to 35 parts by mass of a glass fiber reinforcing material (F), 0 to 10 parts by mass of a polycarbonate resin (G), and 0 to 2 parts by mass of a transesterification inhibitor (H).

2. The polyester resin composition according to claim 1, further comprising 4 to 8 parts by mass of a copolymerized polyethylene terephthalate resin (I) and/or a copolymerized polybutylene terephthalate resin (J).

3. The polyester resin composition according to claim 1, wherein a molding (having a length of 45 mm, a width of 100 mm, and a thickness of 2 mm (a side part of 100 mm has a wall with a height of 6 mm, having a rib part with a length of 14 mm, a height of 2 mm, and a thickness of 1 mm)) obtained by injection molding of the polyester resin composition at a cylinder temperature of 270° C. and a mold temperature of 80° C. has a sink mark with a depth of 3.0 μm or less on the backside of the rib part.

* * * * *